Figure 1:
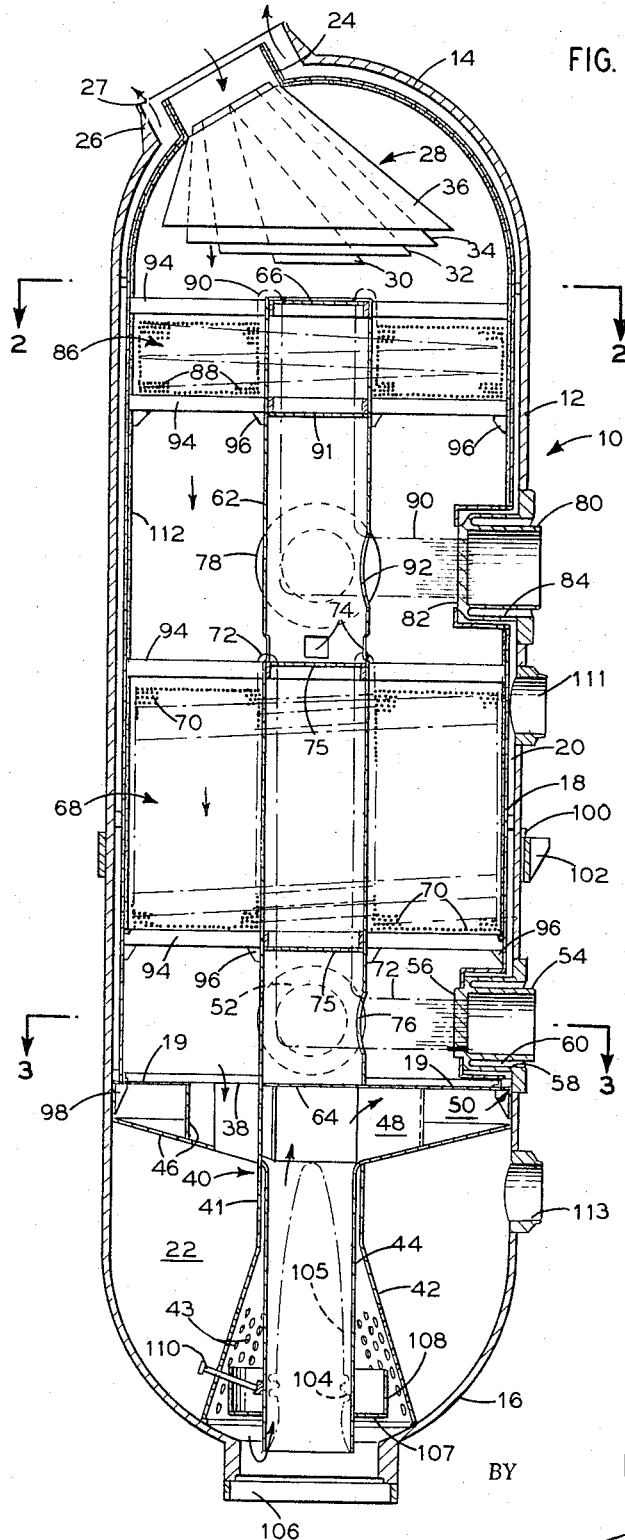

March 14, 1967 D. G. DURST ETAL 3,308,878
HELIUM HEATED STEAM GENERATOR
Filed Sept. 24, 1964 3 Sheets-Sheet 1

INVENTORS
Paul F. Olhoeft
Darrell G. Durst
BY
*J. P. Moran*
ATTORNEY

United States Patent Office 3,308,878
Patented Mar. 14, 1967

3,308,878
HELIUM HEATED STEAM GENERATOR
Darrell G. Durst, Massillon, and Paul F. Olhoeft, Akron, Ohio, assignors to The Babcock & Wilcox Company, New York, N.Y., a corporation of New Jersey
Filed Sept. 24, 1964, Ser. No. 399,012
18 Claims. (Cl. 165—134)

This invention relates to a vapor generator heated by a high temperature fluid and more particularly to such a unit in which the generator shell is protected from the high temperature heating fluid.

In recent years the inlet temperature of the heating medium in fluid heated vapor generators has been increasing steadily. In vapor generators such as employed in gas cooled nuclear reactor plants it has become necessary to avoid any contact between the incoming high temperature heating fluid and the unit's carbon steel shell. It is one of the primary objects of the present invention to provide an economical vapor generator construction whose shell is adequately protected from the high temperature heating fluid entering the generator.

Another objective for generators utilized in nuclear reactor systems is to reduce the overall size of the unit while increasing its efficiency. To increase the efficiency of a nuclear power plant it is important that high pressure superheated steam be produced with provision for it to be subsequently reheated. A problem which must be faced in supplying such a unit is limiting the size of the vapor generator so that correspondingly the size of the reactor containment may be kept to a minimum.

In reactor plants the primary coolant system is enclosed within a large containment vessel often spherical in shape. The size of the containment vessel is determined by the dimensions of the various components it encloses. If the components are large the containment must be correspondingly large. Therefore, not only is it important to limit the size of the various components to reduce their cost but also to reduce the size and cost of the containment vessel. Consequently, it is another primary object of this invention to furnish a vapor generator incorporating the required boiling, superheating and reheating surfaces while supplying a compact construction which will not impose a penalty on the size of the containment.

Another object of the invention is to provide a tubular construction in the vapor generator which affords the maximum heating surfaces within the minimum space and assures that the tubular surfaces are drainable.

Accordingly, the present invention comprises a container disposed within and spaced from a vertically elongated pressure shell. Within the shell a flow space extends about the sides and top of the container. In the container tubular surfaces provide a combined boiler-superheater section and a separate reheater section. The inlets and outlets to these tubular surfaces are positioned so that the tubes are drainable. A heating fluid inlet to the container is located at its upper end and a heating fluid outlet is disposed in its lower end. From the lower end of the container heating fluid enters a chamber in the bottom of the pressure shell. Centrally located in the bottom of the shell is circulating apparatus arranged to receive heating fluid after its passage through the container and to force circulate it upwardly through the annular space between the container and the shell.

The various features of novelty which characterize the invention are pointed out with particularity in the claims annexed to and forming a part of this specification. For a better understanding of the invention, its operating advantages and specific objects attained by its uses, reference should be had to the accompanying drawing and descriptive matter in which there is illustrated and described a preferred embodiment of the invention.

Figure 2:
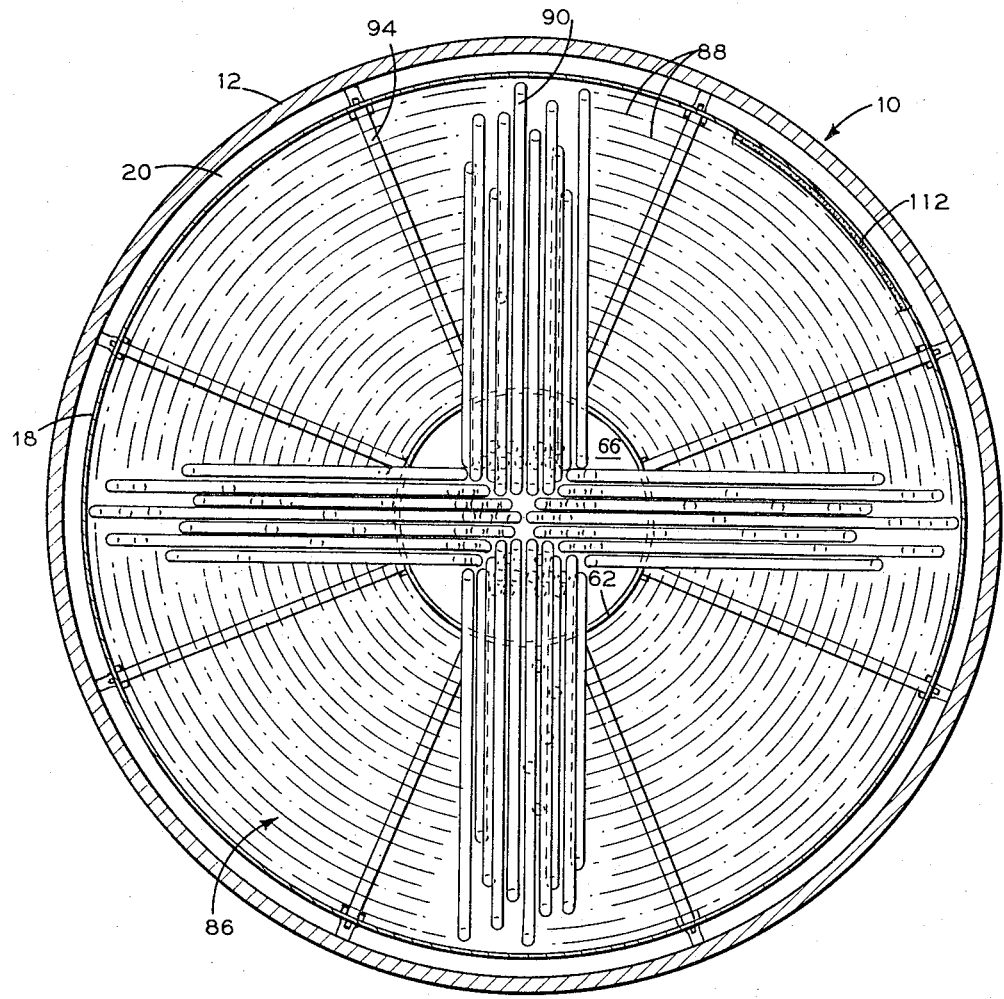
Figure 3:
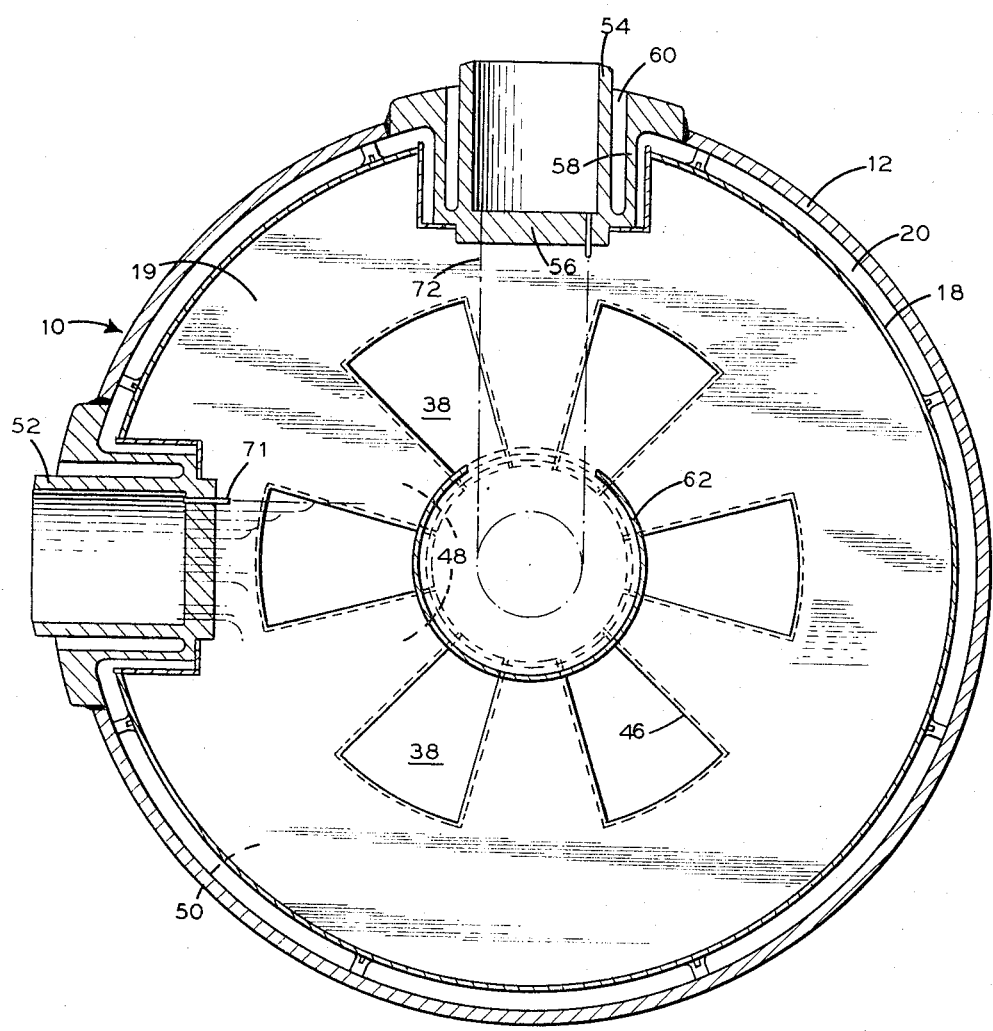

Of the drawings:
FIG. 1 is a vertical section of a fluid heated vapor generator embodying the present invention;
FIG. 2 is a horizontal section taken along line 2—2 in FIG. 1; and
FIG. 3 is a horizontal section taken along line 3—3 in FIG. 1.

In FIG. 1 there is shown a fluid heated vapor generator 10, comprising a vertically elongated pressure shell 12 having hemispherically shaped upper and lower heads 14, 16. Within and in combination with the shell 12 a container 18 forms an annular flow space 20. Though the container 18 is closely spaced from the upper head 14 of the shell its lower end 19 is spaced a considerable distance above the lower head 16 and forms a chamber 22 between the container and the lower head.

Extending through the upper head 14 of the shell and connected to the container is a inlet duct 24. Concentrically disposed about the inlet duct 24 is an outlet duct 26 integrally attached to the shell and forming in combination with the inlet duct an annular shaped passageway 27 communicating with the annular space 20.

Within the container at the mouth of the inlet duct 24 is a diffuser 28 comprising a conically shaped baffle 30 concentrically surrounded by a plurality of spaced frusto-conical plate sections 32, 34, 36. At the opposite end of the container a number of outlet openings 38 communicate with the chamber 22.

In the lower end of the shell a support sleeve 40, having a cylindrical upper section 41 and a frusto-conical lower section 42, extends downwardly from the bottom of the container 18 and is integrally joined to the interior of the lower head 16 of the shell. The lower section 42 of the sleeve contains a number of holes 43. Within and attached to the sleeve 40 a second sleeve 44 extends from a point below the bottom of the container to just above the lower head of the shell.

Plates 46 in combination with the lower end 19 of the container and the sleeve 40 form a number of passageways 48, see FIG. 3, leading from the second sleeve 44 to a ring shaped chamber 50 which in turn communicates with the annular space 20.

Just above the lower end of the container 18 a boiler-superheater inlet header 52 and a boiler-superheater outlet header 54 extend through the walls of the shell into the container. At its end within the container the outlet header 54 is closed by a tube sheet 56. Sleeve 58 is concentrically spaced about the outlet header 54 and extends from the tube sheet 56 to the pressure shell 12. Because of their spaced relationship the outlet header 54 and sleeve 58 form an annular space 60 about the header which opens to the exterior of the vessel. This construction forms a barrier preventing excessive thermal strains which might result from the high temperature vapor flowing through the outlet header 54. The construction of the inlet header 52 is the same as that for the outlet header 54 as can be seen in FIG. 3.

Within the container a vertically arranged conduit 62 extends from its lower to its upper end. At its lower end the conduit 62 is closed by plate 64 and at its upper end by plate 66.

In the container the boiler-superheater tubular section 68 comprises a number of helically coiled tubes 70 arranged about conduit 62. At the upper end of the tubular section 68 its outlet tubes 72 are bent chordally inward passing through openings 74 into the conduit 62 similar to the arrangement shown in FIG. 2. Within the conduit the outlet tubes 72, pass first downwardly through plate 75 and then out of the conduit through an opening 76 and finally are connected into tube sheet 56.

Above the boiler-superheater section 68 reheater inlet header 78 and reheater outlet header 80 extend through the shell and are constructed in the same manner as the outlet header 54 described above. The reheater outlet header 80 comprises tube sheet 82 closing its inner end and sleeve 84 forming a thermal barrier about the header 80. Reheater tubular section 86 located above its inlet and outlet headers is similar in general arrangement to the boiler superheater section 68 and comprises a plurality of helically coiled tubes 88 arranged about the conduit 62. Though not illustrated its inlet tubes extend from the inlet header 78 to the lower end of the tubular section 86. From the upper end of the tubular section 86 its outlet tubes 90 are bent chordally inwardly as shown in FIG. 2, to a point immediately above plate 66 and then pass downwardly through the plate into the conduit 62. Within the conduit the tubes pass downwardly through plate 91 and then through opening 92 and finally terminating in the tube sheet 82.

As can be seen in FIGS. 1 and 2 the helically coiled tubes 70 and 88 are supported by means of radial arms 94 which are located above and below both the reheater and the boiler-superheater sections. Though not illustrated, vertical bars extend between the radial arms 94 providing support for the tubes. The tube support arrangement is in turn supported by means of support gussets 96 mounted on the inner face of the container and on the exterior of the conduit immediately below the lower radial arms 94 of each tubular section. The container 18 itself is carried on support gussets 98, mounted on the inner face of the pressure shell 12 at the lower end of the container. As mentioned earlier, the container is also supported by means of the sleeve 40. Support for the entire unit is provided by means of pads 100, integrally attached to the exterior of the shell which bear on a skirt 102, only a portion of which are shown in FIG. 1.

In the lower end of the shell a blower 104 and its associated diffuser 105 are positioned in the sleeve 44. Any of a number of well known types of fluid circulating equipment may be employed as the blower. Opening 106 in the lower end of the shell forms the entrance through which the blower assembly is inserted into the vapor generator. In the space between the lower half 42 of the support sleeve 40 and the second sleeve 44 plates 107, 108 are provided for absorbing missiles thrown off by the blower and thereby protecting the shell. Pins 110 extend through the support sleeve 40 for centering the second sleeve 44.

A layer of insulation 112 coats the interior of the container 18 from the inlet duct 24 to the lower end of the boiler-superheater tubular section 68.

In the event of a failure in the blower, nozzles 111, 113 connected to an emergency coolant system, not shown, will circulate the heating fluid through the vapor generator 10 and the heat source. The upper nozzle 111 passes through the shell and communicates with the space 20 while the lower nozzle opens into the chamber 22.

It will be noted that the inlet and outlet headers for the tubular sections 68 and 86 are positioned so that the tubes 70 and 88 respectively are drainable.

In a preferred embodiment of the vapor generator just described a gas, such as helium, would be utilized as the heating fluid. The following table sets forth the operating conditions of such a unit where helium, used as the coolant in a gas cooled nuclear reactor, acts as the heating fluid in the vapor generator.

Helium Inlet Temperature, 1322° F. at 435 p.s.i.
Helium Outlet Temperature, 660° F. at 435 p.s.i.
Boiler-Superheater Inlet, 520° F. at 2800 to 2900 p.s.i.
Boiler-Superheater Outlet, 1005° F. at 2512 p.s.i.
Reheater Inlet, 625° F. at 520 p.s.i.
Reheater Outlet, 1002° F. at 490 p.s.i.

In operation the highly heated helium enters the vessel generator 10 through inlet duct 24 passing through the diffuser 28 which uniformly distributes it across the horizontal cross section of the container 18. Within the container the gas passes downwardly about the conduit 62 flowing first over the reheater tubular section 86 and then over the boiler-superheater tubular section 68. It should be noted that a number of plates are located in the conduit to prevent gas from bypassing through the conduit about the reheater and boiler-superheater sections. After flowing through the container the helium streams through passageways 38, see FIG. 3, into chamber 22 in the bottom of the shell. From the chamber 22 the gas flows through the holes 43 into the space between the support sleeve 40 and the second sleeve 44. In this space the gas flows downwardly around the bottom end of the second sleeve 44, and then is force circulated upwardly through the sleeve 44 by the blower 104.

From the upper end of the sleeve 44 the gas flows serially through the segmented passageway 48, the annular chamber 50 and into the annular space 20. In the annular space the gas protects the pressure shell from the high temperature gas flowing through the container. After sweeping upwardly through the annular space the gas leaves the vapor generator through the passageway 27 about the inlet duct 24. At the locations where the headers pass through the shell the container is bent inwardly and attached to the inner face of the tube sheets. In this way the gas flows over the outer surface of the sleeves disposed about the headers and provides protection in these areas against excessive thermal stresses.

The vaporizable fluid, which preferably is water, enters the unit through the boiler-superheater inlet header 52 and then flows upwardly through the helically coiled tubes 70 in counterflow relationship with the gases passing downwardly through the container. From the upper end of the tubular section 68 superheated vapor streams through the tubes 72 to the boiler-superheater outlet header 54. After being expanded and releasing a certain amount of heat at a point of use the vapor returns through piping not illustrated, to the vapor generator entering the reheater inlet header 78. From the header 78 the vapor flows into the helically coiled tubes 88 and is reheated within tubular section 86 as it passes in counterflow relationship with the highly heated helium. It should be noted that the reheater could also be arranged for parallel flow. Finally, the reheated vapor flows through tubes 90 to the reheater outlet header 80 and then is again delivered to a point of use.

Because of the high temperature of the heating fluid the container and its internals are made of stainless steel from the gas inlet 24 to the crossover or passageway 38 to the chamber 22.

This unit by employing helically coiled tubing provides the maximum amount of heating surface while maintaining a minimum height of shell. Further, to achieve optimum boiler efficiency the unit combines both a once-through boiler-superheater section and a reheater section. In a nuclear reactor plant this vapor generator though affording maximum efficiency will, because of its minimum size, permit the use of a reactor containment of reduced size.

Because of their location and arrangement the tube sheets are easily accessible for remote tube plugging. This feature is of particular importance when the vapor generator is employed in a nuclear reactor system and the unit is likely to become radioactive.

While the unit has been described as containing a boiler-superheater section and a reheater section additional tube banks could be simply accommodated to afford double reheat or a secondary superheater.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:
1. A fluid heated vapor generator comprising:
   (A) a vertically elongated pressure shell comprising a vertically extending side wall an upper head and a lower head,
   (B) a container disposed within and spaced from said shell and forming therewith a vertically extending annular flow space,
   (C) heating fluid inlet means extending through the upper end of said shell and annular space and connected to the upper end of said container for supplying heating fluid therein,
   (D) a plurality of vertically extending tubes disposed within said container for flowing a fluid therethrough to be vaporized as it passes in indirect heat exchange relationship with the heating fluid,
   (E) a heating fluid chamber disposed in the lower end of said shell below said container,
   (F) inlet and outlet means for said tubes extending through the vertical side wall of said shell whereby the tubes are drainable, a heating fluid outlet means from the lower end of said container communicating with said chamber,
   (G) heating fluid circulating means disposed in the lower end of said shell and arranged to receive heating fluid from said chamber after it has passed through said container and to deliver it to said annular space whereby the heating fluid cooled in its passage over said tubes protects the pressure shell from the higher temperature heating fluid flowing through the container, and
   (H) heating fluid outlet means from said annular space located at the same end of the vessel as said heating fluid inlet means.

2. A fluid heated vapor generator as set forth in claim 1 wherein said plurality of tubes disposed in said container comprise a first bundle of tubes spaced below a second bundle of tubes.

3. A fluid heated vapor generator as set forth in claim 2 wherein said first bundle comprises a vaporizing and superheating tubular section and said second bundle comprising a reheating tubular section.

4. A fluid heated vapor generator as set forth in claim 3 wherein a vertically arranged conduit is axially positioned within said container, said conduit being closed at its ends.

5. A fluid heated vapor generator as set forth in claim 4 wherein an inlet header and an outlet header for said first bundle of tubes are integrally connected to said vapor generator below said first bundle and extend inwardly into said container.

6. A fluid heated vapor generator as set forth in claim 5 wherein a tube sheet forms a closure for the end of each of said headers within said container.

7. A fluid heated vapor generator as set forth in claim 6 wherein a concentric sleeve is disposed about and spaced from the inner end of said headers and extends between and is integrally connected to said tube sheet and pressure shell for forming a thermal sleeve arrangement about said headers at their connection to said vapor generator.

8. A fluid heated vapor generator as set forth in claim 6 wherein said tubes in said first bundle are fitted into the tube sheet in said inlet header and extend therefrom in a path about said conduit, at the upper end of said bundle said tubes are bent inwardly entering into said conduit and then pass downwardly therethrough to a point below said bundle whereat the tubes are bent outwardly and are connected into the tube sheet in said outlet header.

9. A fluid heated vapor generator as set forth in claim 8 wherein an inlet header and an outlet header for said second bundle of tubes are integrally attached to said shell and extend inwardly into said container in a plane between said first and second bundle, and each of said headers closed by a tube sheet at its end within said container.

10. A fluid heated vapor generator as set forth in claim 9 wherein the tubes of the reheating section extend from said inlet header upwardly about said conduit to the top of the bundle and then downwardly through said conduit to below said second bundle and thence into the tube sheet in said outlet header.

11. A fluid heated vapor generator as set forth in claim 10 wherein the tubes in said first and second bundles are helically coiled about said conduit.

12. A fluid heated vapor generator as set forth in claim 11 wherein the tubes in said first and second bundles are bottom supported off said container and said container is bottom supported off said pressure vessel.

13. A fluid heated vapor generator as set forth in claim 1 wherein said heating fluid inlet means comprises an inlet tubular section connected to said container and extending outwardly therefrom, and said heating fluid outlet means comprises an outlet tubular section connected to said pressure shell and concentrically arranged about said inlet tubular section providing an annular outlet passageway for the heating fluid from the annular space between the pressure shell and the container.

14. A fluid heated vapor generator as set forth in claim 13 wherein a diffuser is located in said container at the mouth of the said inlet tubular section for uniformly distributing the heating fluid into said container with minimum pressure drop.

15. A fluid heated vapor generator as set forth in claim 14 wherein said diffuser comprises a centrally arranged conically shaped baffle and a plurality of spaced frusto-conical plate sections concentrically disposed about said baffle.

16. A fluid heated vapor generator as set forth in claim 1 wherein a sleeve is centrally located in said pressure shell below said container, plate means in combination with the lower end of said container and the upper end of said sleeve forming a number of outlet passageways leading from the lower end of said container to said chamber and a segmented inlet passageway leading from said sleeve to said annular space.

17. A fluid heated vapor generator as set forth in claim 16 wherein a heating fluid circulating device is positioned within said sleeve.

18. A fluid heated vapor generator as set forth in claim 17 wherein said sleeve is arranged to receive heating fluid at its lower end from said chamber and to force circulate said heating fluid upwardly through said sleeve and segmented inlet passageway into said annular space.

References Cited by the Examiner

UNITED STATES PATENTS

| | | | |
|---|---|---|---|
| 2,423,697 | 7/1947 | Garfield | 165—176 X |
| 3,112,735 | 12/1963 | Schlichting et al. | 122—32 |
| 3,162,177 | 12/1964 | Loew et al. | 122—32 |
| 3,209,731 | 10/1965 | Schonberger et al. | 122—32 |

FOREIGN PATENTS

| | | |
|---|---|---|
| 896,339 | 5/1962 | Great Britain. |
| 903,443 | 8/1962 | Great Britain. |

ROBERT A. O'LEARY, *Primary Examiner.*

FREDERICK L. MATTESON, JR., *Examiner.*

M. A. ANTONAKAS, *Assistant Examiner.*